US007904664B2

(12) United States Patent
Tremblay et al.

(10) Patent No.: US 7,904,664 B2
(45) Date of Patent: Mar. 8, 2011

(54) SELECTIVELY MONITORING LOADS TO SUPPORT TRANSACTIONAL PROGRAM EXECUTION

(75) Inventors: Marc Tremblay, Menlo Park, CA (US);
Quinn A. Jacobson, Sunnyvale, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 3 days.

(21) Appl. No.: 11/833,314

(22) Filed: Aug. 3, 2007

(65) Prior Publication Data
US 2007/0283353 A1 Dec. 6, 2007

Related U.S. Application Data

(63) Continuation of application No. 10/637,168, filed on Aug. 8, 2003, now Pat. No. 7,269,694.

(60) Provisional application No. 60/447,128, filed on Feb. 13, 2003.

(51) Int. Cl.
*G06F 12/14* (2006.01)
(52) U.S. Cl. .......................................... 711/145; 712/216
(58) Field of Classification Search ........................ None
See application file for complete search history.

(56) References Cited

U.S. PATENT DOCUMENTS

| | | | | |
|---|---|---|---|---|
| 5,428,761 A | 6/1995 | Herlihy et al. | ................. | 711/130 |
| 5,701,432 A | 12/1997 | Wong et al. | .................... | 711/130 |
| 5,742,785 A | 4/1998 | Stone et al. | .................... | 712/217 |
| 5,758,051 A | 5/1998 | Moreno et al. | ..................... | 714/2 |
| 5,835,764 A | 11/1998 | Platt et al. | ...................... | 718/101 |
| 5,854,928 A * | 12/1998 | Buzbee | .......................... | 717/158 |
| 5,918,005 A | 6/1999 | Moreno et al. | ................... | 714/38 |
| 5,940,827 A | 8/1999 | Hapner et al. | ...................... | 707/8 |
| 5,941,983 A * | 8/1999 | Gupta et al. | .................... | 712/214 |
| 5,974,438 A | 10/1999 | Neufeld | ......................... | 718/104 |
| 6,185,577 B1 | 2/2001 | Nainani et al. | | |
| 6,301,705 B1 * | 10/2001 | Doshi et al. | .................... | 717/154 |
| 6,360,220 B1 | 3/2002 | Forin | ................................. | 707/8 |
| 6,460,124 B1 | 10/2002 | Kagi et al. | ...................... | 711/163 |
| 6,578,088 B2 | 6/2003 | Singhal et al. | ..................... | 707/8 |

(Continued)

OTHER PUBLICATIONS

Publication entitled "Speculation-Based Techniques for Transactional Lock-Free Execution of Lock-Based Programs", by Ravi Rajwar, Online! 2002, XP002286237, Retrieved from the internet: URL:http//bbcr.uwaterloo.ca/{brecht/courses/856/readings-new/rajwar02speculationsbased.pdf.

(Continued)

*Primary Examiner* — Kaushikkumar Patel
(74) *Attorney, Agent, or Firm* — Park, Vaughan, Fleming & Dowler LLP

(57) ABSTRACT

One embodiment of the present invention provides a system that selectively monitors load instructions to support transactional execution of a process, wherein changes made during the transactional execution are not committed to the architectural state of a processor until the transactional execution successfully completes. Upon encountering a load instruction during transactional execution of a block of instructions, the system determines whether the load instruction is a monitored load instruction or an unmonitored load instruction. If the load instruction is a monitored load instruction, the system performs the load operation, and load-marks a cache line associated with the load instruction to facilitate subsequent detection of an interfering data access to the cache line from another process. If the load instruction is an unmonitored load instruction, the system performs the load operation without load-marking the cache line.

20 Claims, 7 Drawing Sheets

U.S. PATENT DOCUMENTS

| | | | |
|---|---|---|---|
| 6,665,708 B1* | 12/2003 | Tikekar et al. | 709/215 |
| 6,681,311 B2 | 1/2004 | Gaskins et al. | 711/203 |
| 6,721,944 B2* | 4/2004 | Chaudhry et al. | 717/154 |
| 6,895,527 B1* | 5/2005 | Quach et al. | 714/5 |
| 6,918,012 B2 | 7/2005 | Venkitakrishnan et al. | 711/150 |
| 6,941,449 B2 | 9/2005 | Ross | 712/35 |
| 7,149,878 B1* | 12/2006 | Jensen et al. | 712/209 |
| 2002/0087810 A1 | 7/2002 | Boatright et al. | 711/145 |
| 2002/0178349 A1 | 11/2002 | Shibayama et al. | 712/235 |
| 2003/0066056 A1 | 4/2003 | Petersen et al. | 717/137 |
| 2003/0079094 A1 | 4/2003 | Rajwar et al. | 711/150 |
| 2004/0162948 A1 | 8/2004 | Tremblay et al. | 711/137 |
| 2004/0162967 A1 | 8/2004 | Tremblay et al. | 712/228 |
| 2004/0186970 A1 | 9/2004 | Kekre et al. | 711/62 |
| 2004/0187123 A1 | 9/2004 | Tremblay et al. | 718/100 |

OTHER PUBLICATIONS

Publication entitled "Checkpoint Processing and Recovery: Towards Scalable Large Instruction Window Processors", by Haitham Akkary et al., Proceedings of the 36$^{th}$ International Symposium on Microarchitecture, 2003, IEEE.

Publication entitled "Multiple Reservations and the Oklahoma Update", by Janice M. Stone et al., IEEE Parallel & Distributed Technology, Nov. 1993, pp. 58-71.

Publication entitled "Improving the Throughput of Synchronization by Insertion of Delays", by Ravi Rajwar et al. Proceedings of the Sixth International Symposium on High-Performance Computer Architecture, Jan. 8-12, 2000, pp. 168-179.

Publication entitled "Checkpoint Processing and Recovery: An Efficient, Scalable Alternative to Reorder Buffers" Haitham Akkary et al. IEEE Computer Society, Nov.-Dec. 2003, pp. 11-19.

Publication entitled "Multi-view Memory to Support OS Locking for Transaction Systems", P. Bodorik et al., IEEE, 1997, pp. 309-318.

Publication entitled "Indexing for Multiversion Locking: Alternatives and Performance Evaluation", Paul M. Bober et al, IEEE Transactions on Knowledge and Data Engineering, vol. 9, No. 1, Jan.-Feb. 1997, pp. 68-84.

Publication entitled: "Transactional Execution: Toward Reliable, High-Performance Multithreading" by Ravi Rajwar et al. IEEE Computer Society, Nov.-Dec. 2003, pp. 117-125.

Publication: "Speculative Lock Elision: Enabling Highly Concurrent Multithreaded Execution" by Ravi Rajwar and James R. Goodman, Computer Sciences Department, University of Wisconsin-Madison, Madison, WI 53706 USA, rajwar@cs.wisc.edu, XP-001075852, published in IEEE Journal Jan. 12, 2001, pp. 294-305.

Publication: "Structured Computer Organization" by Andrew S. Tanenbaum, Published 1999, pp. 5, 7-8.

Publication: "The Transaction Concept: Virtues and Limitations" by Jim Gray. Pro. Int'l Conf. Very Large Databases, Morgan Kaufman, 1981. pp. 144-154.

Publication: "Toward Efficient and Robust Software Speculative Parallelization on Multiprocessors" by Marcelo Cintra and Diego R. Lianos, PPoPP' 03 Jun. 11-13, 2003 ACM 1-58113-588-2/03/0006 pp. 13-24.

Publication: "Microsoft Computer Dictionary" Fifth Edition, pub 2002, p. 378.

Publication: "Speculative Synchronization: Applying Thread-Level Speculation to Explicitly Parallel Applications" by Jose F. Martinez and Josep Torrellas, Dept. of Computer Science, University of Illinois at Urbana-Champaign, Urbana, IL 61801 USA, http://iacoma.cs.uiuc.edu, XP-002285169, published in ASPLOS X, Oct. 2002, pp. 18-29.

Publication: "Transactional Memory: Architectural Support for Lock-Free Data Structures" by Maurice Herlihy, Digital Equip. Corp. Cambridge Research Laboratory, Cambridge, MA 02139, herlihy@crl.dec.com and J. Eliot B. Moss, Dept. of Computer Science, University of Massachusetts, Amherst, MA 01003, moss@cs.umass.edu, XP-000380375, published in Computer Architecture News, May 21, 1993, pp. 289-300.

Publication: "Enhancing Software Reliability with Speculative Threads" by Jeffrey Oplinger and Monica S. Lam, Computer Systems, Laboratory, Stanford University, jeffop@stanford.edu, XP-002285168 published in SPLOS X, Oct. 2202, pp. 184-196.

"The Potential for Using Thread-Level Data Speculation to Facilitate Automatic Parallelization", by J. Gregory Steffan et al., 1998, IEEE, p. 2-13.

"Hybrid Transactional Memory", by Mark Moir, Jul. 2005, XP-002407375.

"Hybrid Hardware/Software Transactional Memory", by Mark Moir, XP-002407376.

Publication: "Lock-Based Programs and Transactional Lock-Free Execution", by Ravi Rajwar et al., University of Wisconsin-Madison Technical Report #1440, Apr. 2002.

Publication: "Speculative Locks for Concurrent Execution of Critical Sections in Shared-Memory Multiprocessors", by Jose F. Martinez et al., Technical Report UIUCDCS-R-2001-2202, Feb. 2001.

Publication: "Transactional Lock-Free Execution of Lock-Based Programs", by Ravi Rajwar, Proceedings of the Tenth International Conference on Architectural Support for Programming Languages and Operating Systems, Oct. 6-Oct. 9, 2002, San Jose, CA.

\* cited by examiner

OLD VERSION　　　　　NEW VERSION

⋮　　　　　　　　　　⋮

ACQUIRE LOCK　　　　　STE　　　<FAIL PC>

⋮　　　　　　　　　　⋮

CRITICAL　　CRITICAL
SECTION　　　　　　　SECTION

⋮　　　　　　　　　　⋮

RELEASE LOCK　　　　　COMMIT

⋮　　　　　　　　　　⋮

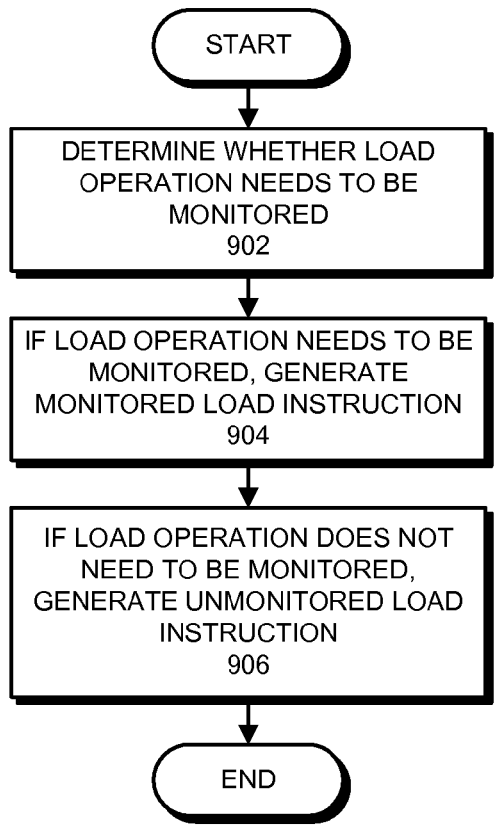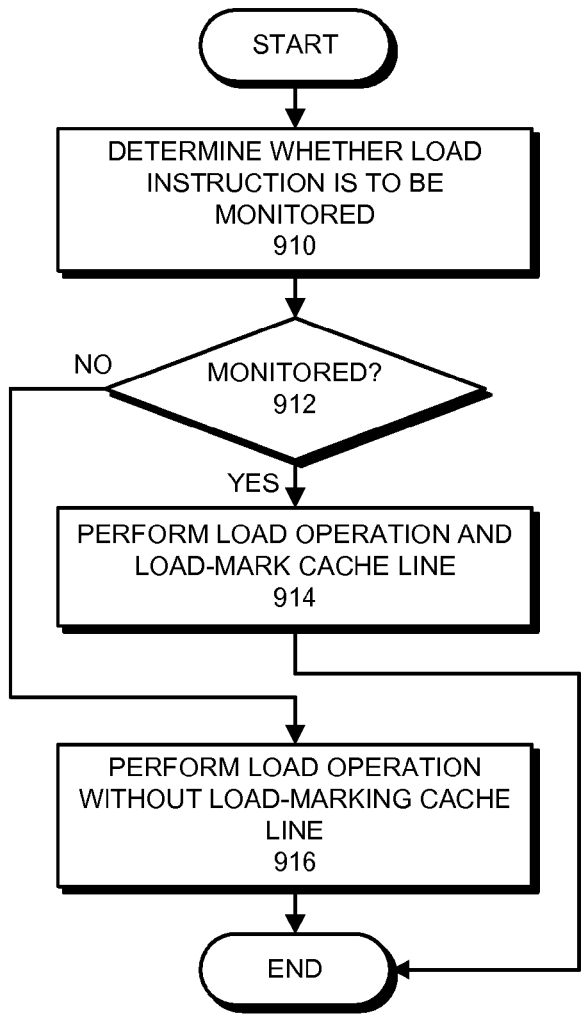
FIG. 9A                    FIG. 9B

SELECTIVELY MONITORING LOADS TO SUPPORT TRANSACTIONAL PROGRAM EXECUTION

RELATED APPLICATION

This application is a continuation of, and hereby claims priority under 35 U.S.C. §120 to, pending U.S. patent application Ser. No. 10/637,168, filed 8 Aug. 2003, entitled, "Selectively Monitoring Loads to Support Transactional Program Execution," by Inventors Marc Tremblay, Quinn A. Jacobson and Shailender Chaudhry. This parent application itself claims priority under 35 U.S.C. §119 to U.S. Provisional Patent Application No. 60/447,128, filed on 13 Feb. 2003, entitled "Transactional Memory," by inventors Shailender Chaudhry, Marc Tremblay and Quinn Jacobson.

The subject matter of this application is additionally related to the subject matter in a co-pending non-provisional U.S. patent application by the same inventors as the instant application and filed on the same day as the instant application entitled, "Selectively Monitoring Stores to Support Transactional Program Execution," having Ser. No. 10/637,167, and filing date Aug. 8, 2003.

BACKGROUND

1. Field of the Invention

The present invention relates to techniques for improving the performance of computer systems. More specifically, the present invention relates to a method and an apparatus for selectively monitoring loads to support transactional program execution.

2. Related Art

Computer system designers are presently developing mechanisms to support multi-threading within the latest generation of Chip-Multiprocessors (CMPs) as well as more traditional Shared Memory Multiprocessors (SMPs). With proper hardware support, multi-threading can dramatically increase the performance of numerous applications. However, as microprocessor performance continues to increase, the time spent synchronizing between threads (processes) is becoming a large fraction of overall execution time. In fact, as multi-threaded applications begin to use even more threads, this synchronization overhead becomes the dominant factor in limiting application performance.

From a programmer's perspective, synchronization is generally accomplished through the use locks. A lock is typically acquired before a thread enters a critical section of code, and is released after the thread exits the critical section. If another thread wants to enter the same critical section, it must acquire the same lock. If it is unable to acquire the lock, because a preceding thread has grabbed the lock, the thread must wait until the preceding thread releases the lock. (Note that a lock can be implemented in a number of ways, such as through atomic operations or semaphores.)

Unfortunately, the process of acquiring a lock and the process of releasing a lock are very time-consuming in modern microprocessors. They involve atomic operations, which typically flush the load buffer and store buffer, and can consequently require hundreds, if not thousands, of processor cycles to complete.

Moreover, as multi-threaded applications use more threads, more locks are required. For example, if multiple threads need to access a shared data structure, it is impractical for performance reasons to use a single lock for the entire data structure. Instead, it is preferable to use multiple fine-grained locks to lock small portions of the data structure. This allows multiple threads to operate on different portions of the data structure in parallel. However, it also requires a single thread to acquire and release multiple locks in order to access different portions of the data structure.

In some cases, locks are used when they are not required. For example, many applications make use of "thread-safe" library routines that use locks to ensure that they are "thread-safe" for multi-threaded applications. Unfortunately, the overhead involved in acquiring and releasing these locks is still incurred, even when the thread-safe library routines are called by a single-threaded application.

Applications typically use locks to ensure mutual exclusion within critical sections of code. However, in many cases threads will not interfere with each other, even if they are allowed to execute a critical section simultaneously. In these cases, mutual exclusion is used to prevent the unlikely case in which threads actually interfere with each other. Consequently, in these cases, the overhead involved in acquiring and releasing locks is largely wasted.

Hence, what is needed is a method and an apparatus that reduces the overhead involved in manipulating locks when accessing critical sections of code.

One technique to reduce the overhead involved in manipulating locks is to "transactionally" execute a critical section, wherein changes made during the transactional execution are not committed to the architectural state of the processor until the transactional execution successfully completes. This technique is described in related U.S. patent application Ser. No. 10/439,911, entitled, "Method and Apparatus for Avoiding Locks by Speculatively Executing Critical Sections," by inventors Shailender Chaudhry Marc Tremblay and Quinn A. Jacobson, filed on 16 May 2003.

During transactional execution, load and store operations are modified so that they mark cache lines that are accessed during the transactional execution. This allows the computer system to determine if an interfering data access occurs during the transactional execution, in which case the transactional execution fails, and results of the transactional execution are not committed to the architectural state of the processor.

Unfortunately, problems can arise while marking cache lines. If a large number of lines are marked, false failures are likely to occur when accesses that appear to interfere with each other do not actually touch the same data items in a cache line. Furthermore, the marked cache lines cannot be easily moved out of cache until the transactional execution completes, which also causes performance problems.

Also, since store operations need to be buffered during transactional execution, transactional execution will sometimes be limited by the number of available store buffers on the processor.

Hence, what is needed is a method and an apparatus that reduces the number of cache lines that need to be marked during transactional program execution.

SUMMARY

One embodiment of the present invention provides a system that selectively monitors load instructions to support transactional execution of a process, wherein changes made during the transactional execution are not committed to the architectural state of a processor until the transactional execution successfully completes. Upon encountering a load instruction during transactional execution of a block of instructions, the system determines whether the load instruction is a monitored load instruction or an unmonitored load instruction. If the load instruction is a monitored load instruction, the system performs the load operation, and load-marks a cache line associated with the load instruction to facilitate subsequent detection of an interfering data access to the cache line from another process. If the load instruction is an unmonitored load instruction, the system performs the load operation without load-marking the cache line.

In a variation on this embodiment, prior to executing the program, the system generates instructions for the program. During this process, the system determines whether load operations that take place during transactional execution need to be monitored. The system then generates monitored load instructions for load operations that need to be monitored, and generates unmonitored load instructions for load operations that do not need to be monitored.

In a variation on this embodiment, the system determines whether a load operation needs to be monitored by determining whether the load operation is directed to a heap, wherein loads from the heap need to be monitored and loads from outside the heap do not need to be monitored.

In a variation on this embodiment, the system determines whether a load operation needs to be monitored by examining a data structure associated with the load operation to determine whether the data structure is a "protected" data structure for which loads need to be monitored, or an "unprotected" data structure for which loads do not need to be monitored.

In a variation on this embodiment, the system determines whether a load operation needs to be monitored by allowing a programmer to determine if the load operation needs to be monitored.

In a variation on this embodiment, the system determines whether a load operation needs to be monitored by examining an op code of the load instruction.

In a variation on this embodiment, the system determines whether a load operation needs to be monitored by examining an address associated with the load instruction to determine whether the address falls within a range of addresses for which loads are monitored. Examining the address can involve comparing the address with one or more boundary registers. It can also involve examining a Translation Lookaside Buffer (TLB) entry associated with the address.

In a variation on this embodiment, if an interfering data access from another process is encountered during transactional execution of the block of instructions, the system discards changes made during the transactional execution and attempts to re-execute the block of instructions.

In a variation on this embodiment, if transactional execution of the block of instructions completes without encountering an interfering data access from another process, the system commits changes made during the transactional execution to the architectural state of the processor, and resumes normal non-transactional execution of the program past the block of instructions.

In a variation on this embodiment, an interfering data access can include: a store by another process to a cache line that has been load-marked by the process; and a load or a store by another process to a cache line that has been store-marked by the process.

In a variation on this embodiment, the cache line is load-marked in level 1 (L1) cache.

One embodiment of the present invention provides a system that selectively monitors store instructions to support transactional execution of a process, wherein changes made during the transactional execution are not committed to the architectural state of a processor until the transactional execution successfully completes. Upon encountering a store instruction during transactional execution of a block of instructions, the system determines whether the store instruction is a monitored store instruction or an unmonitored store instruction. If the store instruction is a monitored store instruction, the system performs the store operation, and store-marks a cache line associated with the store instruction to facilitate subsequent detection of an interfering data access to the cache line from another process. If the store instruction is an unmonitored store instruction, the system performs the store operation without store-marking the cache line.

In a variation on this embodiment, prior to executing the program, the system generates instructions for the program. During this process, the system determines whether store operations that take place during transactional execution need to be monitored. The system then generates monitored store instructions for store operations that need to be monitored, and generates unmonitored store instructions for store operations that do not need to be monitored.

In a variation on this embodiment, the system determines whether a store operation needs to be monitored by determining whether the store operation is directed to a heap, wherein stores from the heap need to be monitored and stores from outside the heap do not need to be monitored.

In a variation on this embodiment, the system determines whether a store operation needs to be monitored by examining a data structure associated with the store operation to determine whether the data structure is a "protected" data structure for which stores need to be monitored, or an "unprotected" data structure for which stores do not need to be monitored.

In a variation on this embodiment, the system determines whether a store operation needs to be monitored by allowing a programmer to determine if the store operation needs to be monitored.

In a variation on this embodiment, the system determines whether the store instruction is a monitored store instruction by examining an op code of the store instruction.

In a variation on this embodiment, the system determines whether the store instruction is a monitored store instruction by examining an address associated with the store instruction to determine whether the address falls within a range of addresses for which stores are monitored.

In a variation on this embodiment, the cache line is store-marked in the cache level closest to the processor where cache lines are coherent.

In a variation on this embodiment, a store-marked cache line can indicate that: loads from other processes to the cache line should be monitored; stores from other processes to the cache line should be monitored; and stores to the cache line should be buffered until the transactional execution completes.

BRIEF DESCRIPTION OF THE FIGURES

FIG. 9A presents a flow chart illustrating how monitored and unmonitored load instructions are generated in accordance with an embodiment of the present invention.

FIG. 9B presents a flow chart illustrating how monitored and unmonitored load instructions are executed in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
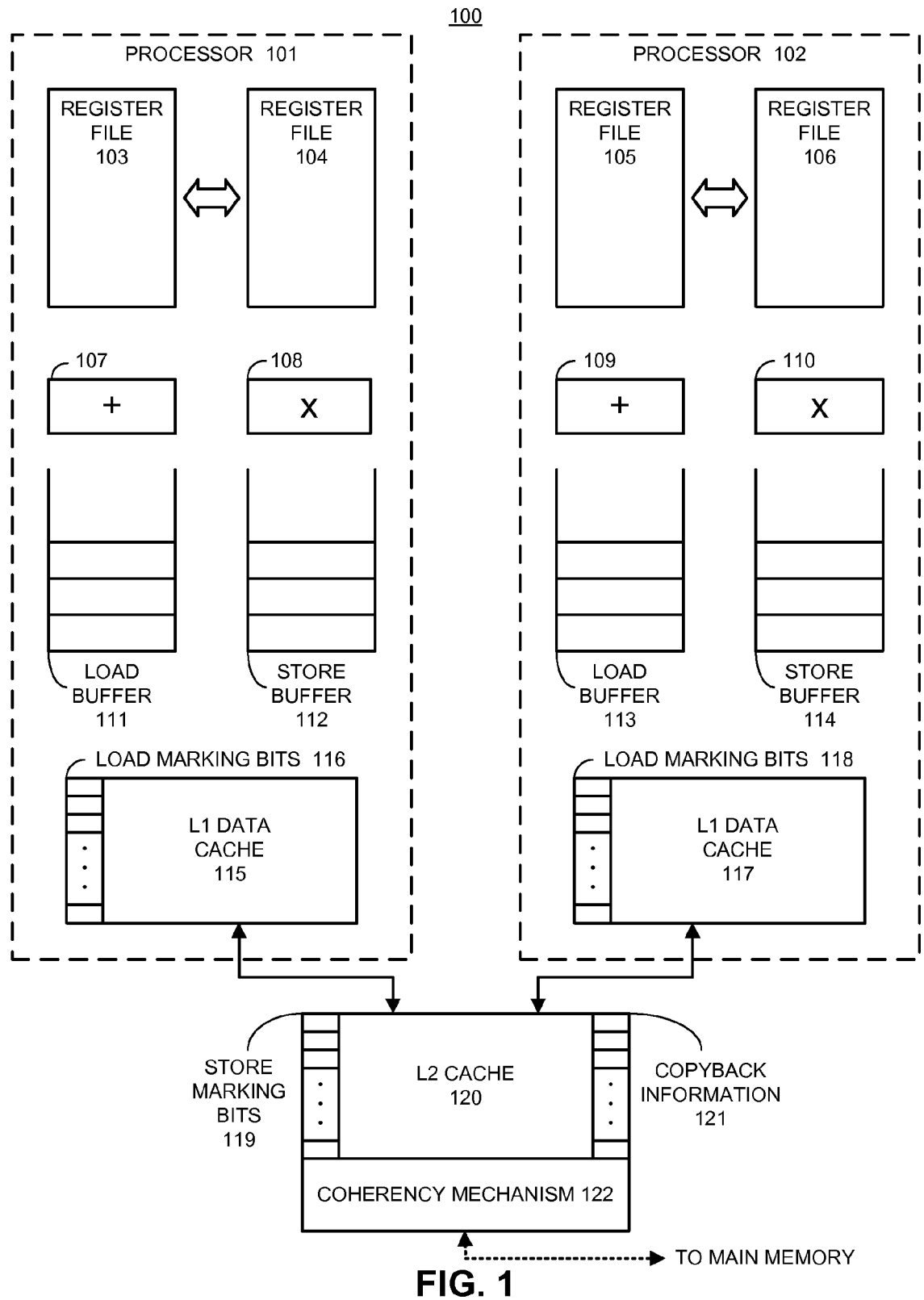
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As is illustrated in FIG. 1, computer system 100 includes processors 101 and level 2 (L2) cache 120, which is coupled to main memory (not shown). Processor 102 is similar in structure to processor 101, so only processor 101 is described below.

Processor 101 has two register files 103 and 104, one of which is an "active register file" and the other of which is a backup "shadow register file." In one embodiment of the present invention, processor 101 provides a flash copy operation that instantly copies all of the values from register file 103 into register file 104. This facilitates a rapid register checkpointing operation to support transactional execution.

Processor 101 also includes one or more functional units, such as adder 107 and multiplier 108. These functional units are used in performing computational operations involving operands retrieved from register files 103 or 104. As in a conventional processor, load and store operations pass through load buffer 111 and store buffer 112.

Processor 101 additionally includes a level one (L1) data cache 115, which stores data items that are likely to be used by processor 101. Note that each line in L1 data cache 115 includes a "load-marking bit," which indicates that a data value from the line has been loaded during transactional execution. This load-marking bit is used to determine whether any interfering memory references take place during transactional execution as is described below with reference to FIGS. 3-8. Processor 101 also includes an L1 instruction cache (not shown).

Note that load-marking does not necessarily have to take place in L1 data cache 115. In general load-marking can take place at any level cache, such as L2 cache 120. However, for performance reasons, the load-marking takes place at the cache level that is closest the processor as possible, which in this case is L1 data cache 115. Otherwise, loads would have to go to L2 cache 120 even on an L1 hit.

L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. US-2002-0199066-A1). This coherency mechanism 122 maintains "copyback information" 121 for each cache line. This copyback information 121 facilitates sending a cache line from L2 cache 120 to a requesting processor in cases where the current version of the cache line must first be retrieved from another processor.

Each line in L2 cache 120 includes a "store-marking bit," which indicates that a data value has been stored to the line during transactional execution. This store-marking bit is used to determine whether any interfering memory references take place during transactional execution as is described below with reference to FIGS. 3-8. Note that store-marking does not necessarily have to take place in L2 cache 120.

Ideally, the store-marking takes place in the cache level closest to the processor where cache lines are coherent. For write-through L1 data caches, writes are automatically propagated to L2 cache 120. However, if an L1 data cache is a write-back cache, we perform store-marking in the L1 data cache. (Note that the cache coherence protocol ensures that any other processor that subsequently modifies the same cache line will retrieve the cache line from the L1 cache, and will hence become aware of the store-mark.)

Executing a Critical Section

Figure 2:
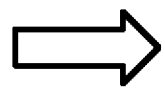
FIG. 2 illustrates how a critical section is executed in accordance with an embodiment of the present invention.

FIG. 2 illustrates how a critical section is executed in accordance with an embodiment of the present invention. As is illustrated in the left-hand side of FIG. 2, a process that executes a critical section typically acquires a lock associated with the critical section before entering the critical section. If the lock has been acquired by another process, the process may have to wait until the other process releases the lock. Upon leaving the critical section, the process releases the lock. (Note that the terms "thread" and "process" are used interchangeably throughout this specification.)

A lock can be associated with a shared data structure. For example, before accessing a shared data structure, a process can acquire a lock on the shared data structure. The process can then execute a critical section of code that accesses the shared data structure. After the process is finished accessing the shared data structure, the process releases the lock.

In contrast, in the present invention, the process does not acquire a lock, but instead executes a start transactional execution (STE) instruction before entering the critical section. If the critical section is successfully completed without interference from other processes, the process performs a commit operation, to commit changes made during transactional execution. This sequence of events is described in more detail below with reference to FIGS. 3-8.

Note that in one embodiment of the present invention a compiler replaces lock-acquiring instructions with STE instructions, and also replaces corresponding lock releasing instructions with commit instructions. (Note that there may not be a one-to-one correspondence between replaced instructions. For example, a single lock acquisition operation comprised of multiple instructions may be replaced by a single STE instruction.) The above discussion presumes that the processor's instruction set has been augmented to include an STE instruction and a commit instruction. These instructions are described in more detail below with reference to FIGS. 3-9.

Transactional Execution Process

Figure 3:
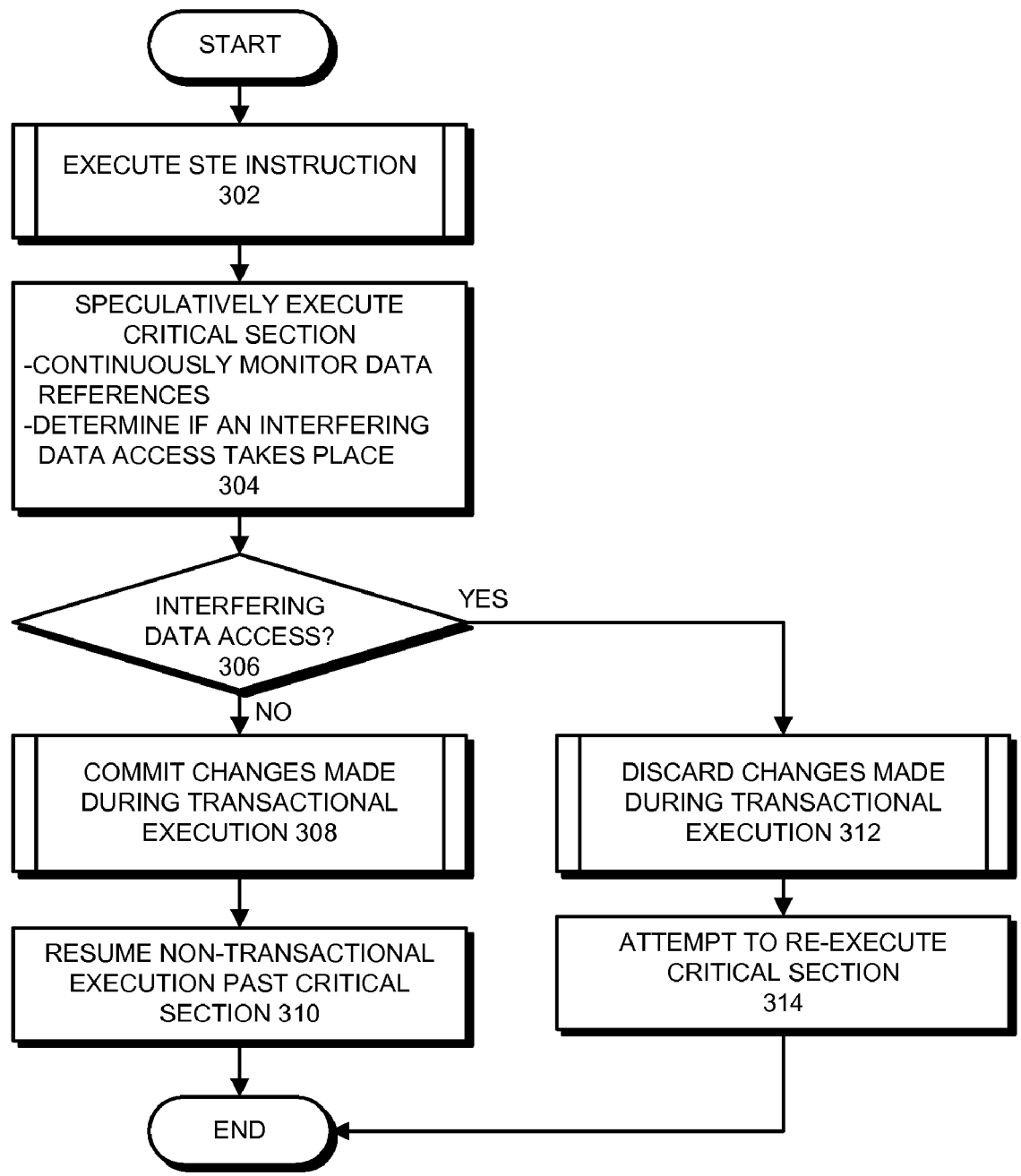
FIG. 3 presents a flow chart illustrating the transactional execution process in accordance with an embodiment of the present invention.

FIG. 3 presents a flow chart illustrating how transactional execution takes place in accordance with an embodiment of the present invention. A process first executes an STE instruction prior to entering of a critical section of code (step 302). Next, the system transactionally executes code within the critical section, without committing results of the transactional execution (step 304).

During this transactional execution, the system continually monitors data references made by other processes, and determines if an interfering data access (or other type of failure) takes place during transactional execution. If not, the system atomically commits all changes made during transactional execution (step 308) and then resumes normal non-transactional execution of the program past the critical section (step 310).

On the other hand, if an interfering data access is detected, the system discards changes made during the transactional execution (step 312), and attempts to re-execute the critical section (step 314).

In one embodiment of the present invention, the system attempts the transactionally re-execute the critical section zero, one, two or more times. If these attempts are not successful, the system reverts back to the conventional technique of acquiring a lock on the critical section before entering the critical section, and then releasing the lock after leaving the critical section.

Note that an interfering data access can include a store by another process to a cache line that has been load-marked by the process. It can also include a load or a store by another process to a cache line that has been store-marked by the process.

Also note that circuitry to detect interfering data accesses can be easily implemented by making minor modifications to conventional cache coherence circuitry. This conventional cache coherence circuitry presently generates signals indicating whether a given cache line has been accessed by another processor. Hence, these signals can be used to determine whether an interfering data access has taken place.

Starting Transactional Execution

Figure 4:
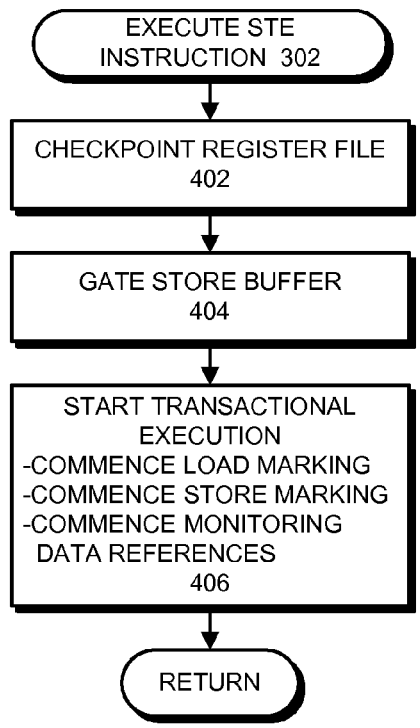
FIG. 4 presents a flow chart illustrating a start transactional execution (STE) operation in accordance with an embodiment of the present invention.

FIG. 4 presents a flow chart illustrating a start transactional execution (STE) operation in accordance with an embodiment of the present invention. This flow chart illustrates what takes place during step 302 of the flow chart in FIG. 3. The system starts by checkpointing the register file (step 402). This can involve performing a flash copy operation from register file 103 to register file 104 (see FIG. 1). In addition to checkpointing register values, this flash copy can also checkpoint various state registers associated with the currently executing process. In general, the flash copy operation checkpoints enough state to be able to restart the corresponding thread.

At the same time the register file is checkpointed, the STE operation also causes store buffer 112 to become "gated" (step 404). This allows existing entries in store buffer to propagate to the memory sub-system, but prevents new store buffer entries generated during transactional execution from doing so.

The system then starts transactional execution (step 406), which involves load-marking and store-marking cache lines, if necessary, as well as monitoring data references in order to detect interfering references.

Load-Marking Process

Figure 5:
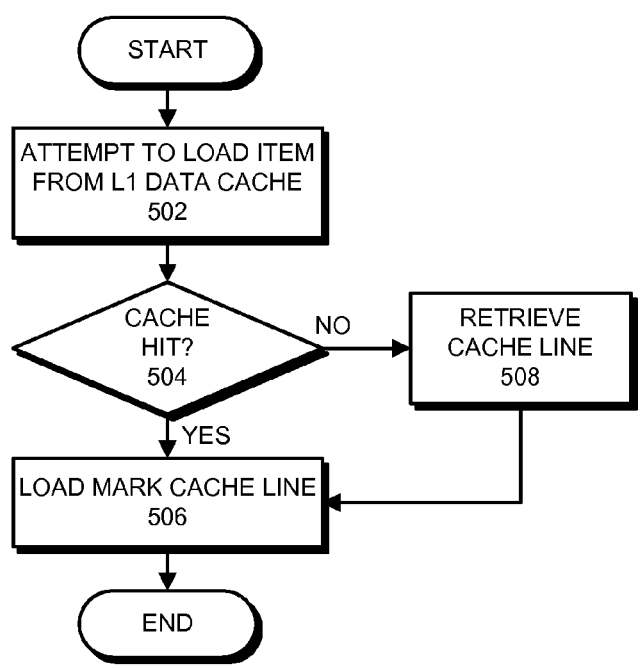
FIG. 5 presents a flow chart illustrating how load-marking is performed during transactional execution in accordance with an embodiment of the present invention.

FIG. 5 presents a flow chart illustrating how load-marking is performed during transactional execution in accordance with an embodiment of the present invention. During transactional execution of a critical section, the system performs a load operation. In performing this load operation if the load operation has been identified as a load operation that needs to be load-marked, system first attempts to load a data item from L1 data cache 115 (step 502). If the load causes a cache hit, the system "load-marks" the corresponding cache line in L1 data cache 115 (step 506). This involves setting the load-marking bit for the cache line. Otherwise, if the load causes a cache miss, the system retrieves the cache line from further levels of the memory hierarchy (step 508), and proceeds to step 506 to load-mark the cache line in L1 data cache 115.

Store-Marking Process

Figure 6:
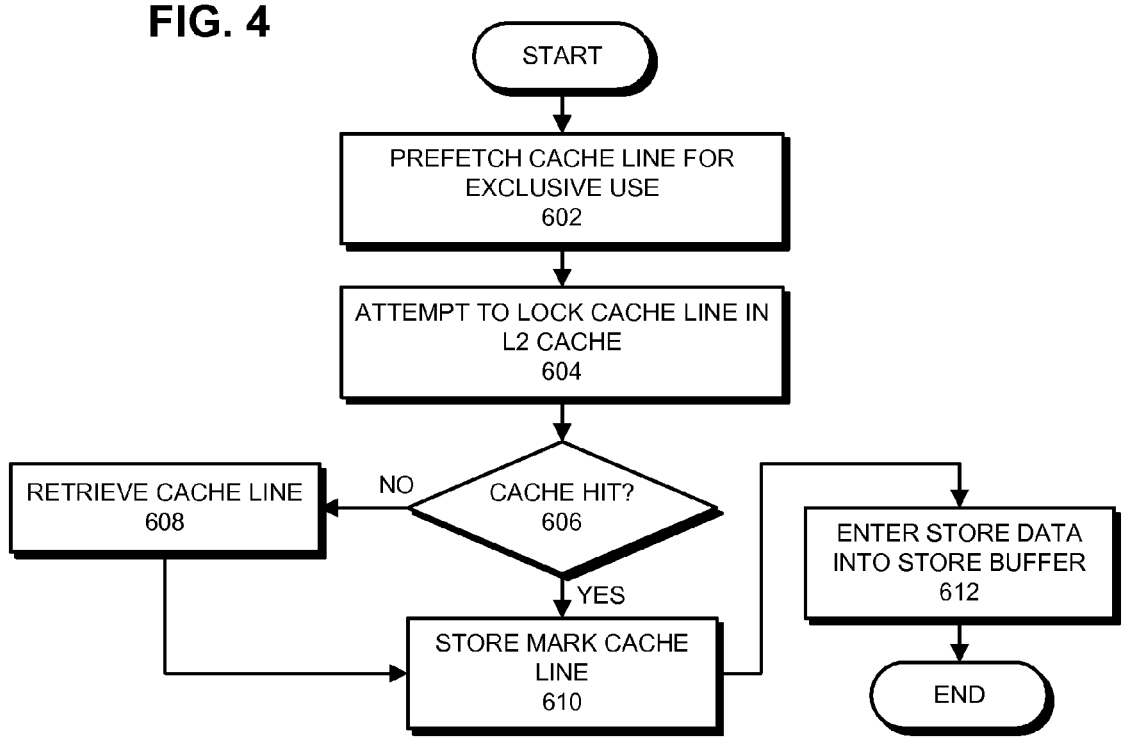
FIG. 6 presents a flow chart illustrating how store-marking is performed during transactional execution in accordance with an embodiment of the present invention.

FIG. 6 presents a flow chart illustrating how store-marking is performed during transactional execution in accordance with an embodiment of the present invention. During transactional execution of a critical section, the system performs a store operation. If this store operation has been identified as a store operation that needs to be store-marked, the system first prefetches a corresponding cache line for exclusive use (step 602). Note that this prefetch operation will do nothing if the line is already located in cache and is already in an exclusive use state.

Since in this example L1 data cache 115 is a write-through cache, the store operation propagates through L1 data cache 115 to L2 cache 120. The system then attempts to lock the cache line corresponding to the store operation in L2 data cache 115 (step 604). If the corresponding line is in L2 cache 120 (cache hit), the system "store-marks" the corresponding cache line in L2 cache 120 (step 610). This involves setting the store-marking bit for the cache line. Otherwise, if the corresponding line is not in L2 cache 120 (cache miss), the system retrieves the cache line from further levels of the memory hierarchy (step 608) and then proceeds to step 610 to store-mark the cache line in L2 cache 120.

Next, after the cache line is store-marked in step 610, the system enters the store data into an entry of the store buffer 112 (step 612). Note that this store data will remain in store buffer 112 until a subsequent commit operation takes place, or until changes made during the transactional execution are discarded.

Note that a cache line that is store marked by a given thread can be read by other threads. Note that this may cause the given thread to fail while the other threads continue.

Commit Operation

Figure 7:
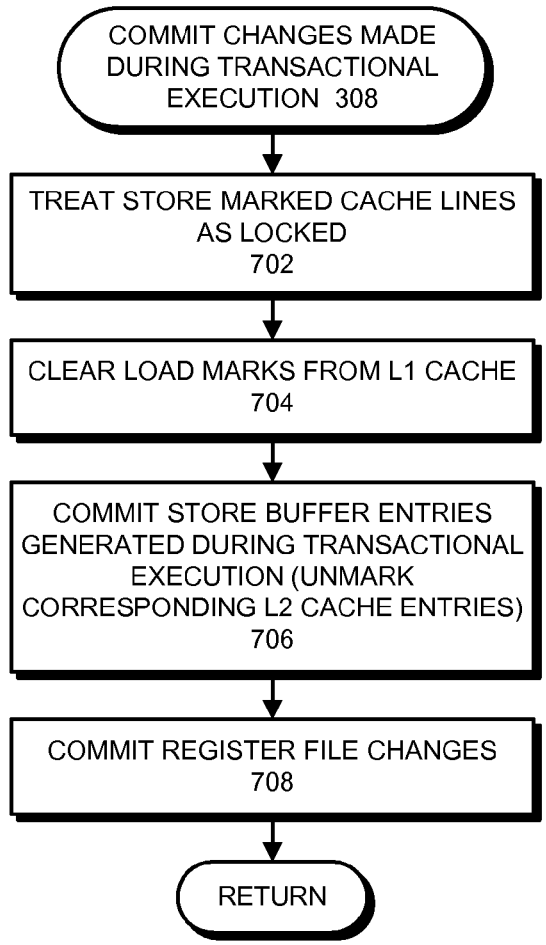
FIG. 7 presents a flow chart illustrating how a commit operation is performed in accordance with an embodiment of the present invention.

FIG. 7 presents a flow chart illustrating how a commit operation is performed after transactional execution completes successfully in accordance with an embodiment of the present invention. This flow chart illustrates what takes place during step 308 of the flow chart in FIG. 3.

The system starts by treating store-marked cache lines as though they are locked (step 702). This means other processes that request a store-marked line must wait until the line is no longer locked before they can access the line. This is similar to how lines are locked in conventional caches.

Next, the system clears load-marks from L1 data cache 115 (step 704).

The system then commits entries from store buffer 112 for stores that are identified as needing to be marked, which were generated during the transactional execution, into the memory hierarchy (step 706). As each entry is committed, a corresponding line in L2 cache 120 is unlocked.

The system also commits register file changes (step 708). For example, this can involve functionally performing a flash copy between register file 103 and register file 104 in the system illustrated in FIG. 1.

Discarding Changes

Figure 8:
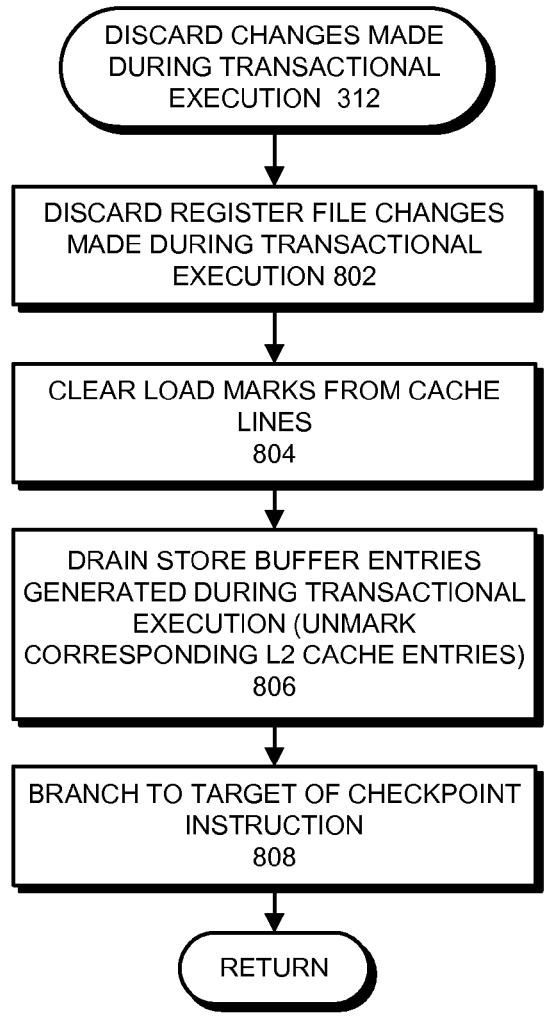
FIG. 8 presents a flow chart illustrating how changes are discarded after transactional execution completes unsuccessfully in accordance with an embodiment of the present invention.

FIG. 8 presents a flow chart illustrating how changes are discarded after transactional execution completes unsuccessfully in accordance with an embodiment of the present invention. This flow chart illustrates what takes place during step 312 of the flow chart in FIG. 3. The system first discards register file changes made during the transactional execution (step 802). This can involve either clearing or simply ignoring register file changes made during transactional execution. This is easy to accomplish because the old register values were checkpointed prior to commencing transactional execution. The system also clears load-marks from cache lines in L1 data cache 115 (step 804), and drains store buffer entries generated during transactional execution without committing them to the memory hierarchy (step 806). At the same time, the system unmarks corresponding L2 cache lines. Finally, in one embodiment of the present invention, the system branches to a target location specified by the STE instruction (step 808). The code at this target location attempts to re-execute the critical section as is described above with reference to step 314 of FIG. 1.

Monitored Load Instructions

FIG. 9A presents a flow chart illustrating how monitored and unmonitored load instructions are generated in accordance with an embodiment of the present invention. This process takes place when a program is being generated to support transactional execution. For example, in one embodiment of the present invention, a compiler or virtual machine automatically generates native code to support transactional execution. In another embodiment, a programmer manually generates code to support transactional execution.

The system first determines whether a given load operation within a block of instructions to be transactionally executed needs to be monitored (step 902). In one embodiment of the present invention, the system determines whether a load operation needs to be monitored by determining whether the load operation is directed to a heap. Note that a heap contains data that can potentially be accessed by other processes. Hence, loads from the heap need to be monitored to detect interference. In contrast, loads from outside the heap, (for example, from the local stack) are not directed to data that is shared by other processes, and hence do not need to be monitored to detect interference.

One embodiment of the present invention determines whether a load operation needs to be monitored at the programming-language level, by examining a data structure associated with the load operation to determine whether the data structure is a "protected" data structure for which loads need to be monitored, or an "unprotected" data structure for which loads do not need to be monitored.

In yet another embodiment, the system allows a programmer to determine whether a load operation needs to be monitored.

If the system determines that a given load operation needs to be monitored, the system generates a "monitored load" instruction (step 904). Otherwise, the system generates an "unmonitored load" instruction (step 906).

There are a number of different ways to differentiate a monitored load instruction from an unmonitored load instruction. (1) The system can use the op code to differentiate a monitored load instruction from an unmonitored load instruction. (2) Alternatively, the system can use the address of the load instruction to differentiate between the two types of instructions. For example, loads directed to a certain range of addresses can be monitored load instructions, whereas loads directed to other address can be unmonitored load instructions.

Also note that an unmonitored load instruction can either indicate that no other process can possibly interfere with the load operation, or it can indicate that interference is possible, but it is not a reason to fail. (Note that in some situations, interfering accesses to shared data can be tolerated.)

FIG. 9B presents a flow chart illustrating how monitored and unmonitored load instructions are executed in accordance with an embodiment of the present invention. The system first determines whether the load instruction is a monitored load instruction or an unmonitored load instruction (step 910). This can be accomplished by looking at the op code of the load instruction, or alternatively, looking at the address for the load instruction. Note that the address can be examined by comparing the address against boundary registers, or possibly examining a translation lookaside buffer (TLB) entry fro the address to determine if the address falls within a monitored range of addresses.

If the load instruction is a monitored load instruction, the system performs the corresponding load operation and load marks the associated cache line (step 914). Otherwise, if the load instruction is an unmonitored load instruction, the system performs the load operation without load-marking the cache line (step 916).

In another embodiment of the present invention, instead of detecting interfering data accesses from other processes, the system does not allow a load operation from the current process cause other processes to fail. This can be accomplished by propagating additional information during the coherency transactions associated with the load operation to ensure that the load operation does not cause another process to fail.

Monitored Store Instructions

Figure 10A:
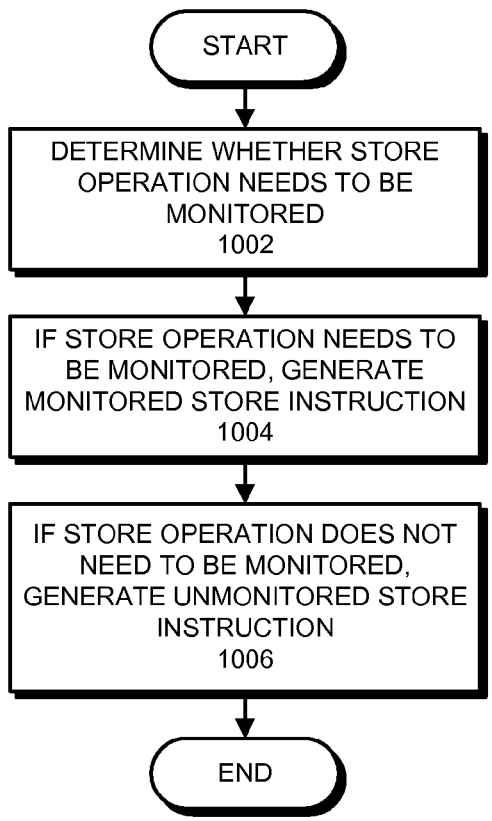
FIG. 10A presents a flow chart illustrating how monitored and unmonitored store instructions are generated in accordance with an embodiment of the present invention.

FIG. 10A presents a flow chart illustrating how monitored and unmonitored store instructions are generated in accordance with an embodiment of the present invention. As was described above for load operations, this process can take place when a compiler or virtual machine automatically generates native code to support transactional execution, or when a programmer manually generates code to support transactional execution.

The system first determines whether a store operation within a block of instructions to be transactionally executed needs to be monitored (step 1002). This determination can be made in the based on the same factors as for load instructions.

If the system determines that a store operation needs to be monitored, the system generates a "monitored store" instruction (step 1004). Otherwise, the system generates an "unmonitored store" instruction (step 1006).

Note that monitored store instructions can be differentiated from unmonitored store instructions in the same way that monitored load instructions can be differentiated from unmonitored load instructions, for example the system can use different op codes or different address ranges.

Figure 10B:
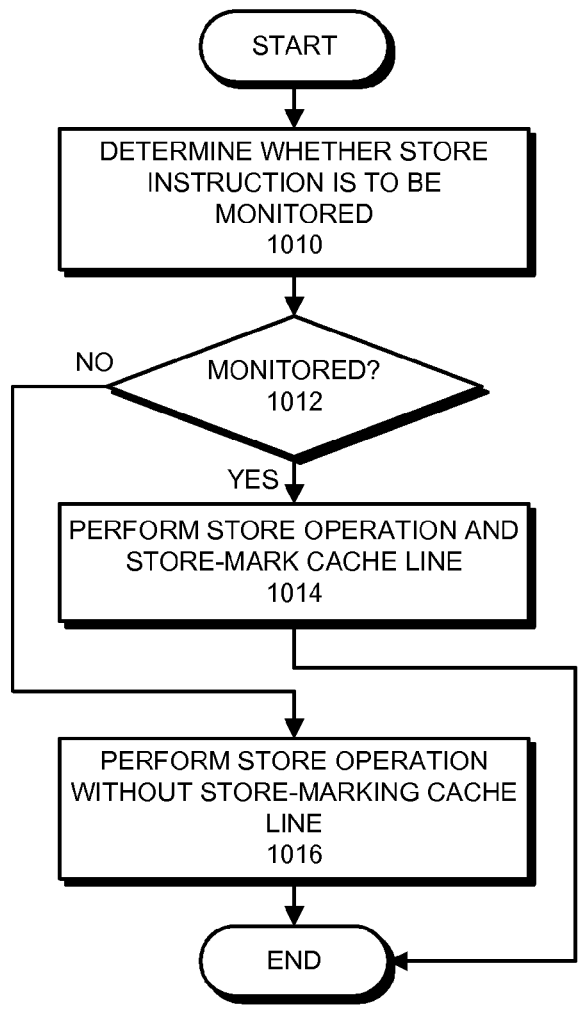
FIG. 10B presents a flow chart illustrating how monitored and unmonitored store instructions are executed in accordance with an embodiment of the present invention.

FIG. 10B presents a flow chart illustrating how monitored and unmonitored store instructions are executed in accordance with an embodiment of the present invention. The system first determines whether the store instruction is a monitored store instruction or an unmonitored store instruction (step 1010). This can be accomplished by looking at the op code for the store instruction, or alternatively, looking at the address for the store instruction. If the store instruction is a monitored store instruction, the system performs the corresponding store operation and store marks the associated cache line (step 1014). Otherwise, if the store instruction is an unmonitored store instruction, the system performs the store operation without store-marking the cache line (step 1016).

Note that a store-marked cache line can indicate one or more of the following: (1) loads from other processes to the cache line should be monitored; (2) stores from other processes to the cache line should be monitored; or (3) stores to the cache line should be buffered until the transactional execution completes.

In another embodiment of the present invention, instead of detecting interfering data accesses from other processes, the system does not allow a store operation from the current process cause another process to fail. This can be accomplished by propagating additional information during coherency transactions associated with the store operation to ensure that the store operation does not cause another process to fail.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selectively monitoring load instructions to support transactional execution of a process, comprising:
   generating instructions for a program, wherein the program includes a block of instructions that is to be executed transactionally during transactional execution, wherein changes made during the transactional execution are not committed to an architectural state of a processor until the transactional execution successfully completes, and wherein generating instructions involves determining without programmer intervention which of the load instructions that take place during transactional execution need to be monitored;
   while generating instructions for the program:
      encountering a load instruction within the block of instructions;
      determining whether the load instruction is to be monitored during transactional execution by examining an address of the load instruction to determine whether the load is directed to an address within a range of addresses for which load instructions are to be monitored;
      if the load instruction is to be monitored, generating a monitored load instruction to perform a corresponding load operation and load-mark a cache line associated with the load instruction to facilitate subsequent detection of an interfering data access to the cache line from another process; and
      otherwise, generating an unmonitored load instruction to perform the corresponding load operation without load-marking the cache line.

2. The method of claim 1, wherein determining whether a load operation needs to be monitored can involve examining a data structure associated with the load operation to determine whether the data structure is a "protected" data structure for which loads need to be monitored, or an "unprotected" data structure for which loads do not need to be monitored.

3. The method of claim 1, wherein determining whether a load operation needs to be monitored can involve determining whether the load operation is directed to a heap, wherein loads from the heap need to be monitored and loads from outside the heap do not need to be monitored.

4. The method of claim 1, wherein examining the address involves comparing the address with one or more boundary registers.

5. The method of claim 1, wherein examining the address involves examining a Translation Lookaside Buffer (TLB) entry associated with the address.

6. The method of claim 1, wherein if an interfering data access from another process is encountered during transactional execution of the block of instructions, the method further comprises:
   discarding changes made during the transactional execution; and
   attempting to re-execute the block of instructions.

7. The method of claim 1, wherein if transactional execution of the block of instructions completes without encountering an interfering data access from another process, the method further comprises:
   committing changes made during the transactional execution to the architectural state of the processor; and
   resuming normal non-transactional execution of the program past the block of instructions.

8. The method of claim 1, wherein an interfering data access can include:
   a store by another process to a cache line that has been load-marked by the process; and
   a load or a store by another process to a cache line that has been store-marked by the process.

9. The method of claim 1, wherein the cache line is load-marked in level 1 (L1) cache.

10. An apparatus that selectively monitors load instructions to support transactional execution of a process, comprising:
    a processor;
    an instruction generation mechanism in the processor configured to generate instructions for a program, wherein the program includes a block of instructions that is to be executed transactionally during transactional execution, wherein changes made during the transactional execution are not committed to an architectural state of the processor until the transactional execution successfully completes, and wherein generating instructions involves determining without programmer intervention which of the load instructions that take place during transactional execution need to be monitored;

wherein upon encountering a load instruction within the block of instructions, the instruction generation mechanism is configured to:

determine whether the load instruction is to be monitored during transactional execution by examining an address of the load instruction to determine whether the load is directed to an address within a range of addresses for which load instructions are to be monitored;

if the load instruction is to be monitored, to generate a monitored load instruction to perform a corresponding load operation, and to load-mark a cache line associated with the load instruction to facilitate subsequent detection of an interfering data access to the cache line from another process; and otherwise, to generate an unmonitored load instruction to perform the corresponding load operation without load-marking the cache line.

11. The apparatus of claim 10, wherein the instruction generation mechanism is configured to determine whether a load operation needs to be monitored by examining a data structure associated with the load operation to determine whether the data structure is a "protected" data structure for which loads need to be monitored, or an "unprotected" data structure for which loads do not need to be monitored.

12. The apparatus of claim 10, wherein the instruction generation mechanism is configured to determine whether a load operation needs to be monitored by determining whether the load operation is directed to a heap, wherein loads from the heap need to be monitored and loads from outside the heap do not need to be monitored.

13. The apparatus of claim 10, further comprising an execution mechanism within the processor, wherein the execution mechanism is configured to support transactional execution of the block of instructions.

14. The apparatus of claim 13, wherein the execution mechanism is configured to examine the address by comparing the address with one or more boundary registers.

15. The apparatus of claim 13, wherein the execution mechanism is configured to examine the address by examining a Translation Lookaside Buffer (TLB) entry associated with the address.

16. The apparatus of claim 13, wherein if an interfering data access from another process is encountered during transactional execution of the block of instructions, the execution mechanism is configured to:

discard changes made during the transactional execution; and to attempt to re-execute the block of instructions.

17. The apparatus of claim 13, wherein if transactional execution of the block of instructions completes without encountering an interfering data access from another process, the execution mechanism is configured to:

commit changes made during the transactional execution to the architectural state of the processor; and to resume normal non-transactional execution of the program past the block of instructions.

18. The apparatus of claim 10, wherein an interfering data access can include:

a store by another process to a cache line that has been load-marked by the process; and a load or a store by another process to a cache line that has been store-marked by the process.

19. The apparatus of claim 10, wherein the cache line is load-marked in level 1 (L1) cache.

20. A computer system that selectively monitors load instructions to support transactional execution of a process, comprising:

a processor;

a memory;

an instruction generation mechanism configured to generate instructions for a program, wherein the program includes a block of instructions that is to be executed transactionally during transactional execution, wherein changes made during the transactional execution are not committed to an architectural state of a processor until the transactional execution successfully completes, and wherein generating instructions involves determining without programmer intervention which of the load instructions that take place during transactional execution need to be monitored;

wherein upon encountering a load instruction within the block of instructions, the instruction generation mechanism is configured to:

determine whether the load instruction is to be monitored during transactional execution by examining an address of the load instruction to determine whether the load is directed to an address within a range of addresses for which load instructions are to be monitored;

if the load instruction is to be monitored during the transaction, to generate a monitored load instruction to perform a corresponding load operation, and to load-mark a cache line associated with the load instruction to facilitate subsequent detection of an interfering data access to the cache line from another process; and otherwise, to generate an unmonitored load instruction to perform the corresponding load operation without load-marking the cache line.

* * * * *